United States Patent
Malone et al.

(10) Patent No.: US 6,802,540 B2
(45) Date of Patent: Oct. 12, 2004

(54) METHOD AND APPARATUS FOR COUPLING A CONDUIT TO A FITTING

(75) Inventors: Dennis Malone, Indian Springs, OH (US); David Bruce Rader, Urbana, OH (US); Jerry Gordon Glatt, Lebanon, OH (US); James H. Jones, Xenia, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/322,869

(22) Filed: Dec. 18, 2002

(65) Prior Publication Data

US 2004/0119281 A1 Jun. 24, 2004

(51) Int. Cl.[7] ............................. F16L 33/00; B21D 39/00
(52) U.S. Cl. ................. 285/256; 285/259; 29/890.144; 29/508; 29/515
(58) Field of Search ................................ 285/256, 257, 285/382, 148.13, 148.16, 148.17, 239, 242; 29/508, 510, 515, 890.144

(56) References Cited

U.S. PATENT DOCUMENTS

| | | | | |
|---|---|---|---|---|
| 601,591 A | * | 3/1898 | Sherman | 285/256 |
| 1,786,489 A | * | 12/1930 | Hopkins | 285/256 |
| 1,804,814 A | * | 5/1931 | Schultis | 285/334.5 |
| 1,825,005 A | * | 9/1931 | Loughead | 285/256 |
| 2,310,536 A | * | 2/1943 | Melsom | 29/508 |
| 2,314,001 A | * | 3/1943 | Lusher et al. | 285/256 |
| 2,453,997 A | * | 11/1948 | MacWilliam | 285/256 |
| 2,865,094 A | * | 12/1958 | Press | 29/506 |
| 2,902,299 A | * | 9/1959 | Turner | 285/258 |
| 2,978,263 A | * | 4/1961 | Walsh et al. | 285/256 |
| 3,047,043 A | * | 7/1962 | Albrecht | 29/237 |
| 3,325,194 A | * | 6/1967 | Grawey | 285/257 |
| 3,371,408 A | * | 3/1968 | Charbonnet | 29/508 |
| 3,512,810 A | * | 5/1970 | Harris | 285/256 |
| 3,529,855 A | * | 9/1970 | Bragg | 285/331 |
| 3,750,452 A | * | 8/1973 | Frank | 72/402 |
| 4,018,460 A | * | 4/1977 | Morris et al. | 285/39 |
| 4,133,565 A | * | 1/1979 | Shutt | 285/334.5 |
| RE30,940 E | * | 5/1982 | Kowal et al. | 72/115 |
| 4,335,753 A | * | 6/1982 | Frye | 138/109 |
| 4,664,424 A | * | 5/1987 | Smith | 285/256 |
| 4,684,157 A | * | 8/1987 | Smith | 285/256 |
| 4,804,212 A | * | 2/1989 | Vyse | 285/256 |
| 4,854,525 A | | 8/1989 | Chee | |
| 4,969,669 A | * | 11/1990 | Sauer | 285/256 |
| 5,044,675 A | * | 9/1991 | Sauer | 285/256 |
| 5,064,144 A | | 11/1991 | Chee | |
| 5,137,309 A | * | 8/1992 | Beagle | 285/256 |
| 5,199,751 A | * | 4/1993 | Beagle et al. | 285/256 |
| 5,222,360 A | | 6/1993 | Antuna et al. | |
| 5,283,951 A | * | 2/1994 | Davenport et al. | 29/890.144 |
| 5,358,012 A | * | 10/1994 | Kish | 138/109 |
| 5,381,773 A | | 1/1995 | Straub | |
| 5,396,761 A | | 3/1995 | Woltmann et al. | |
| 5,467,758 A | | 11/1995 | Moriyama et al. | |
| 5,944,359 A | * | 8/1999 | Andronaco | 285/55 |
| 5,961,157 A | * | 10/1999 | Baron et al. | 285/256 |
| 6,232,703 B1 | | 5/2001 | Huffman | |
| 6,311,733 B1 | * | 11/2001 | Azzolini et al. | 138/109 |

* cited by examiner

Primary Examiner—James M. Hewitt
(74) Attorney, Agent, or Firm—William Scott Andes; Armstrong Teasdale LLP

(57) ABSTRACT

A method for coupling a conduit to a fitting. The method includes providing a fitting having at least one groove defined therein and a collar having a flange extending from an end of the collar, aligning the flange with the groove, and compressing the collar around a portion of the fitting to facilitate fixedly securing the flange within the groove, such that the collar is fixedly secured to the fitting.

18 Claims, 3 Drawing Sheets

METHOD AND APPARATUS FOR COUPLING A CONDUIT TO A FITTING

BACKGROUND OF THE INVENTION

This invention relates generally to fittings, and more specifically to methods and apparatus for coupling a conduit to a fitting.

At least some known conduit fitting assemblies include a collar coupled to an end fitting. The end of the conduit end is received within a portion of the collar, and a portion of the end fitting is received within the conduit end. More specifically, the portion of the collar that includes the conduit end is then compressed radially inwardly such that the conduit end is compressed between the end fitting and the collar. When compressed, friction created between the collar and an outer surface of the conduit end, and friction created between an inner surface of the conduit end and the end fitting retains the conduit end within the collar.

At least some known collars are threadably coupled to the conduit end fitting, while other known collars include an offset that mates with a reduced diameter portion of the end fitting when compressed to secure the collar to the end fitting. However, such conduit fitting assemblies may require an extended length to ensure a secure connection is created between the collar and the conduit end fitting. Accordingly, the cost and overall weight of the conduit fitting assembly may be increased. Furthermore, known end fitting assemblies may not include a generally uniform end fitting nipple portion outer diameter, which may increase difficulty of inserting the fitting nipple portion within the conduit end.

BRIEF DESCRIPTION OF THE INVENTION

A method is provided for coupling a conduit to a fitting. The method includes providing a fitting having at least one groove defined therein and a collar having a flange extending from an end of the collar, aligning the flange with the groove, and compressing the collar around a portion of the fitting to facilitate fixedly securing the flange within the groove, such that the collar is fixedly secured to the fitting.

A collar is provided for coupling a conduit to a fitting. The fitting includes a surface having a groove defined therein. The collar includes a body extending between a first end and a second end. At least one of the body first end and the body second end is sized to receive a portion of the fitting therein. The collar also includes a flange extending from the body first end and configured to be fixedly secured within the fitting groove when the collar body is compressed around the portion of the fitting received within the body, such that the collar is fixedly secured to the fitting.

A fitting assembly is provided including a conduit having a body extending between a first end and a second end. The assembly also includes a fitting having a body extending between a first end and a second end. The fitting body includes a groove defined in an external surface thereof, and a nipple portion adjacent the fitting first end. In addition, the assembly includes a collar having a body extending between a first end and a second end. The collar includes a flange extending from the collar first end. The conduit first end is at least partially received within the collar body. The fitting nipple portion is at least partially received within the conduit first end. The collar body is compressed radially around the conduit first end, the fitting nipple portion, and the fitting groove such that the flange is fixedly secured within the fitting groove.

DETAILED DESCRIPTION OF THE INVENTION

As used herein, the term "conduit" may include any apparatus through which a fluid may be conveyed. For example, a conduit may include a tube, a pipe, a duct, a flexible hose, and/or a non-flexible hose. The above examples are intended as exemplary only, and thus are not intended to limit in any way the definition and/or meaning of the term "conduit".

Figure 1:
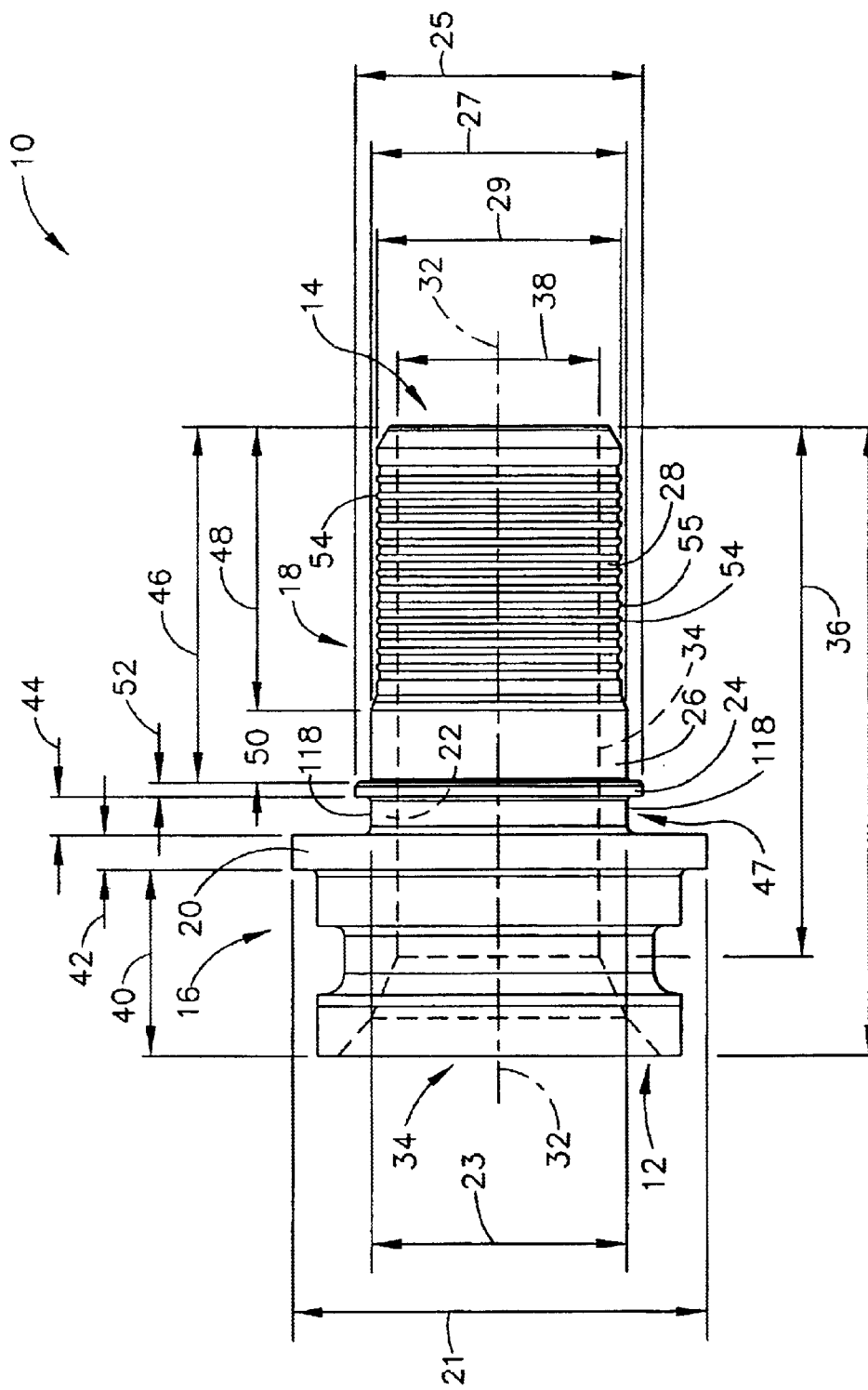
FIG. 1 is a side view of an exemplary end fitting for use with a conduit fitting assembly.

FIG. 1 is a side view of an exemplary end fitting 10 for use with a conduit fitting assembly (not shown in FIG. 1). End fitting 10 includes a first end 12, a second end 14, a fitting portion 16, and a nipple portion 18. End fitting 10 also includes a first annular portion 20 having a first diameter 21, a second annular portion 22 having second diameter 23, a third annular portion 24 having a third diameter 25, a fourth annular portion 26 having a fourth diameter 27, and a fifth annular portion 28 having a fifth diameter 29. In one embodiment, fourth diameter 27 is substantially equal to second diameter 23.

End fitting 10 has an overall length 30 measured between first end 12 and second end 14. A central axis 32 extends through end fitting 10 from first end 12 to second end 14. A substantially cylindrical passageway 34 extends through end fitting 10 from second end 14 to fitting portion 16 for a length 36. In the exemplary embodiment, passageway 34 has a substantially constant diameter 38 that is smaller than first diameter 21, second diameter 23, third diameter 25, fourth diameter 27, and fifth diameter 29. Fitting portion 16 is a distance 40 from end fitting first end 12, and is configured to couple with a second end fitting (not shown) such that passageway 34 is in coupled fluid communication with a passageway (not shown) extending through the second fitting.

End fitting first annular portion 20 has a width 42 extending between end fitting second annular portion 22 and fitting portion 16. End fitting second annular portion 22 has a width 44 extending between first annular portion 20 and end fitting third annular portion 24. A groove 47, hereinafter referred to as flange groove 47, is defined between end fitting second annular portion 22 and third annular portion 24. Nipple portion 18 is adjacent end fitting second end 14 and extends a distance 46 from end fitting second end 14 to end fitting third annular portion 24. Accordingly, nipple portion 18 includes fourth annular portion 26 and fifth annular portion 28. Fifth annular portion 28 extends a distance 48 from end fitting second end 14 to fourth annular portion 26, and fourth annular portion 26 extends a width 50 between fifth annular portion 28 and third annular portion 24. End fitting third annular portion 24 has a width 52 extending between end fitting second annular portion 22 and fourth annular portion 26. Nipple fifth annular portion 28 includes a plurality of projections 54 that extend outwardly therefrom and define nipple fifth diameter 29. As will be discussed in greater detail below, projections 54 facilitate retaining end fitting nipple portion 18 within a conduit end (not shown in FIG. 1).

Figure 2:
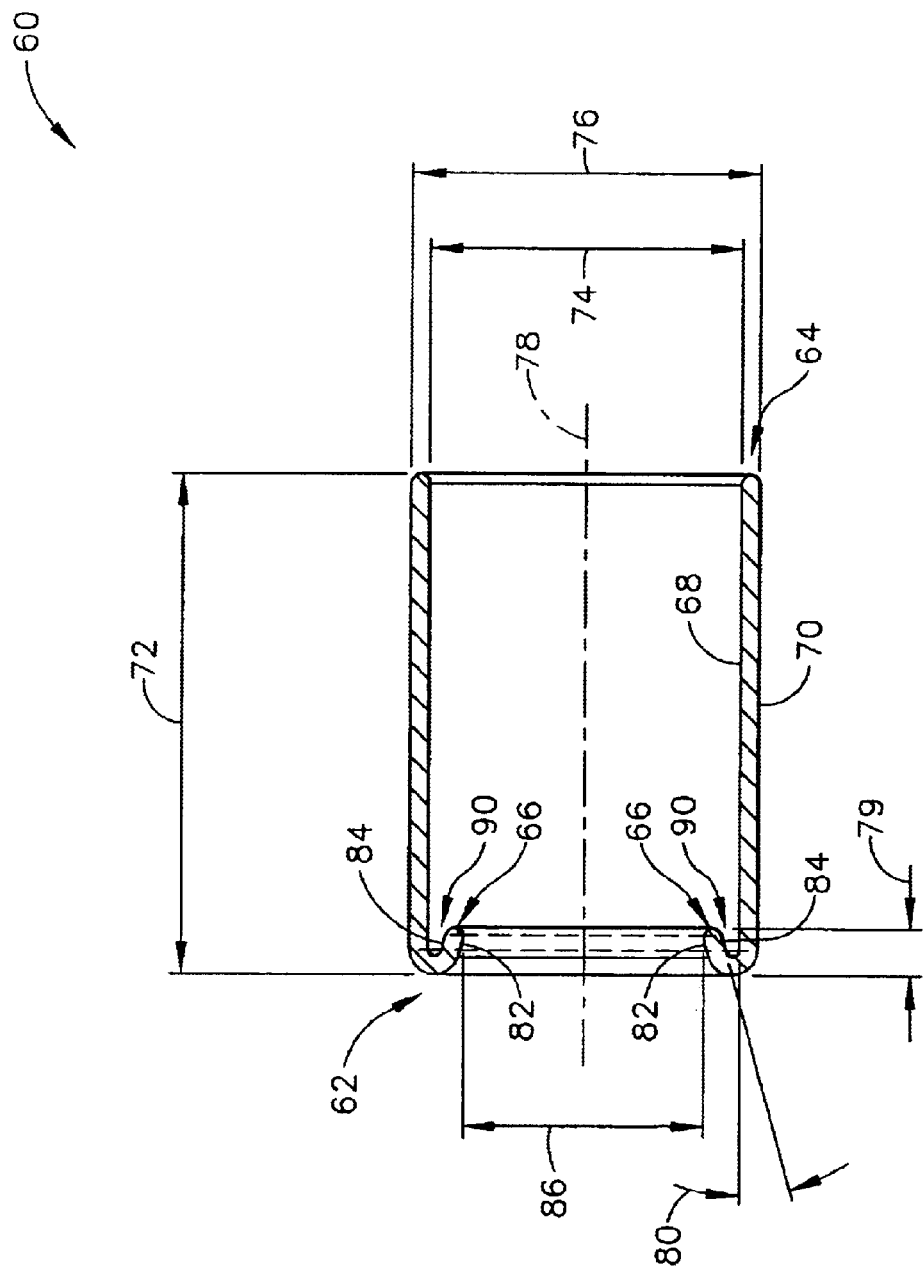
FIG. 2 is a cross-sectional view of an exemplary collar for use with a conduit fitting assembly.

FIG. 2 is a cross-sectional view of an exemplary collar 60 for use with a conduit fitting assembly (not shown in FIG. 2). Collar 60 includes a first end 62, a second end 64, a flange 66, a radially inner surface 68, and a radially outer surface 70. Collar 60 extends a length 72 between collar ends 62 and 64. In the exemplary embodiment, collar 60 is substantially cylindrical. An inner diameter 74 of collar 50 is defined by collar radially inner surface 68, and an outer diameter 76 of collar 60 is defined by collar radially outer surface 70. Collar 60 also includes a central axis 78 that extends through collar length 72. Flange 66 extends generally radially inwardly from collar first end 62 for a length 79, towards collar second end 64. In the exemplary embodiment, flange length 79 is smaller than end fitting second annular portion width 44, such that flange 79 can be received within flange groove 47. Accordingly, flange 66 extends outwardly from collar first end 62 at an angle 80 relative to collar radially inner surface 68 such that flange 66 is obliquely aligned with respect to collar radially inner surface 68. In one embodiment, angle 80 is approximately equal to 9.5° relative to radially inner surface 68. In another embodiment, angle 80 may be between approximately 9° and 10° relative to radially inner surface 68.

Flange 66 includes a radially inner surface 82 and a radially outer surface 84. Flange radially inner surface 82 defines an inner diameter 86 of flange 66 that is larger than end fitting second diameter 23. In addition, flange 66 includes a flange gap 90 that is defined by flange radially outer surface 84 and collar radially inner surface 68, and more specifically, by flange angle 80.

Figure 3:
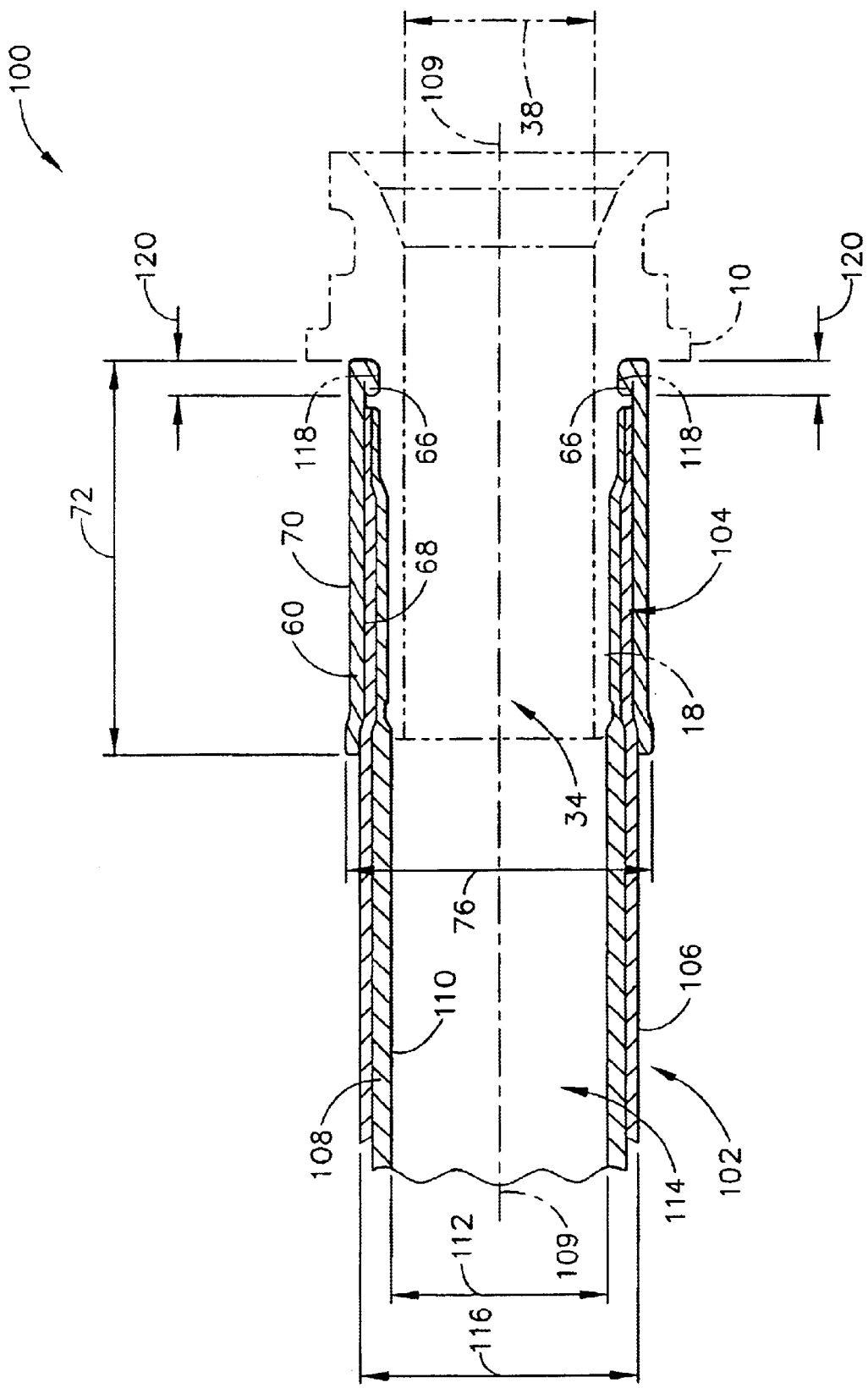
FIG. 3 is a cross-sectional view of a conduit fitting assembly including the end fitting shown in FIG. 1, and the collar shown in FIG. 2.

FIG. 3 is a cross-sectional view of a conduit fitting assembly 100 including end fitting 10, collar 60, and a conduit 102. Conduit 102 includes a first end 104, a second end (not shown), a radially outer surface 106, and a liner 108. A central axis 109 extends through conduit 102 between conduit first end 104 and the conduit second end. A radially inner surface 110 of conduit liner 108 defines an inner diameter 112 of conduit 102. Conduit liner inner surface 110 also defines a passageway 114 that extends substantially through the length of conduit 102 between conduit first end 104 and the conduit second end. Conduit radially outer surface 106 defines an outer diameter 116 of conduit 102. Conduit 102 is received within a portion of collar 60, and end fitting nipple portion 18 is received within a portion of conduit 102, such that conduit passageway 114 is coupled in fluid communication with end fitting passageway 34. In the exemplary embodiment, conduit inner diameter 112 is smaller than nipple fourth diameter 27 and nipple fifth diameter 29. In addition, in the exemplary embodiment, conduit outer diameter 116 is smaller than collar inner diameter 74.

To assemble conduit fitting assembly 100, conduit first end 104 is inserted within a portion of collar 60 such that conduit 102 and collar 60 are substantially concentrically aligned, and such that conduit central axis 109 is substantially co-linearly aligned with collar central axis 78. End fitting nipple portion 18 is then inserted within conduit first end 104 such that flange 66 is at least partially received in flange groove 47, and such that end fitting 10 is generally concentrically aligned with conduit 102 and collar 60. More specifically, end fitting central axis 32 is substantially co-linearly aligned with collar central axis 78 and conduit central axis 109. Compressive force is then applied around at least a portion of collar radially outer surface 70 such that conduit 102 is compressed radially inwardly between end fitting nipple portion 18 and collar 60. More specifically, a portion of conduit 102 is compressed radially inwardly between nipple fifth annular portion 28 and collar radially inner surface 68, and a portion of conduit 102 is compressed between collar radially inner surface 68 and nipple fourth annular portion 26.

Compression of collar 60 also forces flange 66 within flange groove 47, such that flange radially inner surface 82 contacts an outer surface 118 of end fitting second diameter portion 22, and such that flange 66 is compressed. Compression of flange 66 causes flange gap 90 to substantially close such that flange radially outer surface 84 contacts collar radially inner surface 68. Accordingly, when compressed, flange 66 is substantially parallel with collar radially inner surface 68. In addition, when flange 66 is compressed flange 66 extends a length 120 from collar first end 62 towards collar second end 64. In the exemplary embodiment, flange length 120 is approximately equal to end fitting second annular portion width 44, such that flange 66 fits securely within flange groove 47 when compressed.

Once collar 60 has been compressed, friction between collar radially inner surface 68 and conduit radially outer surface 106 facilitates retaining conduit first end 104 within collar 60 such that first end 104 is fixedly secured to collar 60. In one embodiment, conduit radially outer surface 106 includes a wirebraid (not shown) that facilitates retaining conduit first end 104 within collar 60 such that first end 104 is fixedly secured to collar 60. In addition, friction between projections 54 and conduit liner inner surface 110 facilitates retaining end fitting nipple portion 18 within conduit first end 104 such that end fitting nipple portion 18 is fixedly secured within conduit first end 104. Furthermore, when collar 60 has been compressed, flange 66 facilitates retaining a portion of end fitting 10 within collar 60 such that end fitting 10 is fixedly secured to collar 60. Once conduit fitting assembly has been assembled, conduit passageway 114 is coupled in fluid communication with end fitting passageway 34 and is substantially sealed with respect to end fitting passageway 34, such that fluid does not leak from conduit fitting assembly 100. More specifically, compression of conduit 102 between fourth annular portion 26 and collar radially inner surface 68, and fifth annular portion 28 and collar radially inner surface 68, facilitates sealing conduit fitting assembly 100 to facilitate preventing fluid flow and/or leakage between conduit liner inner surface 110 and the radially outer surfaces of fitting nipple portion 18.

The above-described conduit fitting assembly is cost-effective and highly reliable for coupling a conduit to a fitting. The assembly permits a lightweight and low-cost collar to be precision mated to an end fitting without the use of a threaded connection. More specifically, the assembly allows the use of an end fitting that is shorter, thereby decreasing the weight and cost of the assembly, and increasing the amount of conduit that is flexible. As a result, the assembly facilitates coupling a conduit to a fitting in a cost-effective and reliable manner.

Exemplary embodiments of conduit fitting assemblies are described above in detail. The assemblies are not limited to the specific embodiments described herein, but rather, components of each assembly may be utilized independently and separately from other components described herein. Each fitting assembly component can also be used in combination with other fitting assembly components.

While the invention has been described in terms of various specific embodiments, those skilled in the art will recognize that the invention can be practiced with modification within the spirit and scope of the claims.

What is claimed is:

1. A method for coupling a conduit to a fitting, said method comprising:

providing a fitting having at least one groove defined therein and a collar having a flange extending from an end of the collar;

inserting a portion of a conduit within a portion of the collar and aligning the flange with the groove; and compressing the collar around a portion of the fitting such that a portion of the flange is compressed against an inner surface of the collar to facilitate fixedly securing the flange within the groove, such that the collar is fixedly secured to the fitting.

2. A method in accordance with claim 1 wherein providing a fitting having at least one groove therein and a collar having a flange extending from an end of the collar comprises forming the flange integrally with the collar.

3. A method in accordance with claim 1 wherein aligning the flange with the groove comprises inserting a portion of the fitting within a portion of the collar.

4. A method in accordance with claim 1 wherein aligning the flange with the groove further comprises:

and inserting a portion of the fitting within the portion of the conduit that is received within the collar.

5. A method in accordance with claim 1 wherein the collar is substantially cylindrical, and compressing the collar around a portion of the fitting comprises compressing the collar such that the collar is compressed radially inwardly around a portion of the fitting.

6. A method in accordance with claim 1 wherein compressing the collar around a portion of the fitting comprises compressing a portion of the conduit between the collar and a portion of the fitting, such that the conduit is fixedly secured to the collar and the fitting.

7. A collar for coupling a conduit to a fitting having a surface including a groove defined therein, said collar comprising:

a body extending between a first end and a second end, at least one of said body first end and said body second end sized to receive a portion of the fitting therein; and a flange extending from said body first end and configured to be fixedly secured within the fitting groove when said collar body is compressed around the portion of the fitting received within the body, such that a portion of said flange is compressed against a radially inner surface of the collar within said fitting groove to facilitate fixedly securing said collar to the fitting; and wherein the fitting includes an external surface, and the groove is formed in the external surface.

8. A collar in accordance with claim 7 wherein said collar body is substantially cylindrical.

9. A collar in accordance with claim 7 wherein said flange is integrally formed with said collar body.

10. A collar in accordance with claim 7 wherein said flange extending radially inwardly from said body first end towards said body second end such that said flange is axially aligned with respect to said collar body radially inner surface.

11. A collar in accordance with claim 7 wherein the fitting groove includes a radially inner surface, a first side surface, and a second side surface, said flange compressible within the fitting groove such that said flange substantially contacts said collar body radially inner surface, the fitting groove radially inner surface, the fitting groove first side surface, and the fitting groove second side surface to fixedly secure said flange within the fitting groove.

12. A fitting assembly comprising:

a conduit comprising a body extending between a first end and a second end;

a fitting comprising a body extending between a first end and a second end, said fitting body comprising a groove defined in an external surface thereof, and a nipple portion adjacent said fitting first end;

a collar comprising a body extending between a first end and a second end, and a flange extending from said collar first end, said conduit first end at least partially received within said collar body, said fitting nipple portion at least partially received within said conduit first end, said collar body compressed radially around said conduit first end, said fitting nipple portion, and said fitting groove such that a portion of said flange is compressed against a radially inner surface of the collar within said fitting groove to facilitate fixedly securing said flange within said fitting groove.

13. A fitting assembly in accordance with claim 12 wherein said conduit comprises a passageway extending through said conduit body, said fitting comprises a passageway extending through said fitting body, said conduit passageway coupled in fluid communication with said fitting passageway.

14. A fitting assembly in accordance with claim 12 wherein said first conduit end is compressed between said collar body and said fitting nipple portion to facilitate preventing fluid flow between a radially inner surface of said first conduit end and a radially outer surface of said fitting nipple portion.

15. A fitting assembly in accordance with claim 12 wherein said conduit body comprises a radially outer surface configured to receive a wirebraid therein.

16. A fitting assembly in accordance with claim 12 wherein said fitting nipple portion comprises a radially outer surface comprising at least one projection extending therefrom.

17. A fitting assembly in accordance with claim 12 wherein said flange extends from said collar first end towards said fitting groove comprises a radially inner surface, said collar body comprising a radially inner surface, said flange compressed within said fitting groove such that said flange radially inner surface contacts said fitting groove radially inner surface and such that said flange radially outer surface contacts said collar body radially inner surface.

18. A fitting assembly in accordance with claim 12 wherein said flange is fixedly secured within said fitting groove such that said flange fixedly secures said collar to said fitting, said conduit first end is compressed between said collar body and said fitting nipple portion such that said conduit is fixedly secured to said collar.

* * * * *

UNITED STATES PATENT AND TRADEMARK OFFICE
CERTIFICATE OF CORRECTION

PATENT NO. : 6,802,540 B2
DATED : October 12, 2004
INVENTOR(S) : Malone et al.

It is certified that error appears in the above-identified patent and that said Letters Patent is hereby corrected as shown below:

Column 5,
Lines 22-23, after "comprises:" delete "and".

Signed and Sealed this

Twenty-seventh Day of September, 2005

JON W. DUDAS
*Director of the United States Patent and Trademark Office*